United States Patent
Bos

(10) Patent No.: US 8,712,394 B2
(45) Date of Patent: Apr. 29, 2014

(54) SYSTEMS, METHODS, AND APPARATUS TO PREPARE A MOBILE DEVICE FOR PROVISIONING

(75) Inventor: Jeffrey Charles Bos, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 47 days.

(21) Appl. No.: 13/325,337

(22) Filed: Dec. 14, 2011

(65) Prior Publication Data

US 2013/0157637 A1 Jun. 20, 2013

(51) Int. Cl.
*H04M 3/00* (2006.01)

(52) U.S. Cl.
USPC .......................................... 455/418; 455/419

(58) Field of Classification Search
USPC ................ 455/418, 419, 423, 425, 433, 41.1, 455/41.2, 517, 553.1, 573, 575.1, 575.8, 455/127.5, 128, 420; 370/346
See application file for complete search history.

(56) References Cited

U.S. PATENT DOCUMENTS

| | | | |
|---|---|---|---|
| 7,200,390 B1 | 4/2007 | Henager et al. | |
| 7,668,612 B1 | 2/2010 | Okkonen | |
| 7,881,665 B2 | 2/2011 | Symons | |
| 8,092,251 B2 | 1/2012 | Rosenblatt | |
| 2008/0143487 A1 | 6/2008 | Hulvey | |
| 2009/0168088 A1* | 7/2009 | Rosenblatt | 358/1.12 |
| 2009/0254857 A1 | 10/2009 | Romine et al. | |
| 2009/0278493 A1 | 11/2009 | Alden | |
| 2009/0307140 A1 | 12/2009 | Mardikar | |
| 2010/0045441 A1 | 2/2010 | Hirsch et al. | |
| 2010/0167643 A1 | 7/2010 | Hirsch | |
| 2011/0173606 A1* | 7/2011 | Hatori | 717/178 |
| 2012/0081213 A1 | 4/2012 | Rosenblatt | |
| 2012/0142310 A1* | 6/2012 | Pugh et al. | 455/406 |
| 2012/0142327 A1* | 6/2012 | Urbanek | 455/418 |
| 2012/0280650 A1* | 11/2012 | Kim et al. | 320/108 |

FOREIGN PATENT DOCUMENTS

| | | |
|---|---|---|
| EP | 2348405 A1 | 7/2011 |
| WO | 03/024139 A2 | 3/2003 |
| WO | 2010/048315 A2 | 4/2010 |

OTHER PUBLICATIONS

Josh Lowensohn, "Apple Patent Hints at Wireless Charging for Boxed Gadgets", CNet News, Apr. 5, 2012, http://news.cnet.com/8301-27076_3-57409970-248/apple-patent-hints-at-wireless-charging-for-boxed-gadgets/ (5 pages).

European Patent Office, "Extended European Search Report" issued in EP Application No. 11193547.4, dated Apr. 18, 2012, 7 pages.

* cited by examiner

*Primary Examiner* — Ajit Patel

(74) *Attorney, Agent, or Firm* — Hanley, Flight & Zimmerman, LLC

(57) ABSTRACT

Systems, methods, and apparatus to prepare a mobile device for provisioning are disclosed. An example method includes recording information about a mobile device via wireless communications in response to detecting a presence of the mobile device in a first location, determining a software version of the mobile device via wireless communications, and updating the software of the mobile device via wireless communications prior to provisioning the mobile device to a user.

20 Claims, 5 Drawing Sheets

SYSTEMS, METHODS, AND APPARATUS TO PREPARE A MOBILE DEVICE FOR PROVISIONING

FIELD OF THE DISCLOSURE

This disclosure relates generally to mobile devices and, more particularly, to systems, methods, and apparatus to prepare a mobile device for provisioning.

BACKGROUND

Mobile devices may be obtained at a retail or online point-of-sale. At the time of purchase, the mobile device is provisioned and provided with a phone number. In a business setting, mobile devices may also be obtained from an information technology department of the business. In the business setting, the mobile devices may also undergo a provisioning process prior to being given to the user.

DETAILED DESCRIPTION

Many mobile devices are manufactured and provided with an initial software package (e.g., an operating system, applications, etc.). Some of these mobile devices are then sent to a point-of-sale or to an information technology department of a customer, where the mobile devices are stored until they are to be provisioned to a user. While the device is in storage or on display, the manufacturer of the mobile devices may update the software of the mobile devices to, for example, provide new or improved features. The device manufacturers do not automatically send (e.g., push) the updated software to previously-shipped devices. As a result, when a mobile device is provisioned to the user, the feature set present on a mobile device having the initially-installed software package is out-of-date. To achieve the improved functionality of the device, the user must update the device herself, which may take a substantial amount of time and spoil the user's desired initial experience of obtaining a mobile device having the latest features. Further, the user may be required to connect the mobile device to a power source for a substantial period of time to charge the battery prior to use. This may also spoil the user's initial experience.

To overcome these issues and provide an improved experience to a user, the systems, methods, and apparatus disclosed herein prepare a mobile device for provisioning to the user. Some example systems, methods, and apparatus determine a software version of a mobile device via wireless communications and update the software of the mobile device via wireless communications prior to provisioning the mobile device to a user.

As used herein, provisioning a mobile device refers to the process of enabling services and/or otherwise preparing the mobile device for use by the end user of the mobile device. For example, a mobile device may be provisioned at a point-of-sale (e.g., a mobile phone retailer) when a customer purchases the mobile device. In this example, the mobile device is assigned a phone number and/or other identifying information, the identifying information for the mobile device is registered with the network of the mobile communications provider (e.g., Verizon®, AT&T®, Sprint®, T-Mobile®, etc.), and service is enabled for the mobile device.

Figure 1:
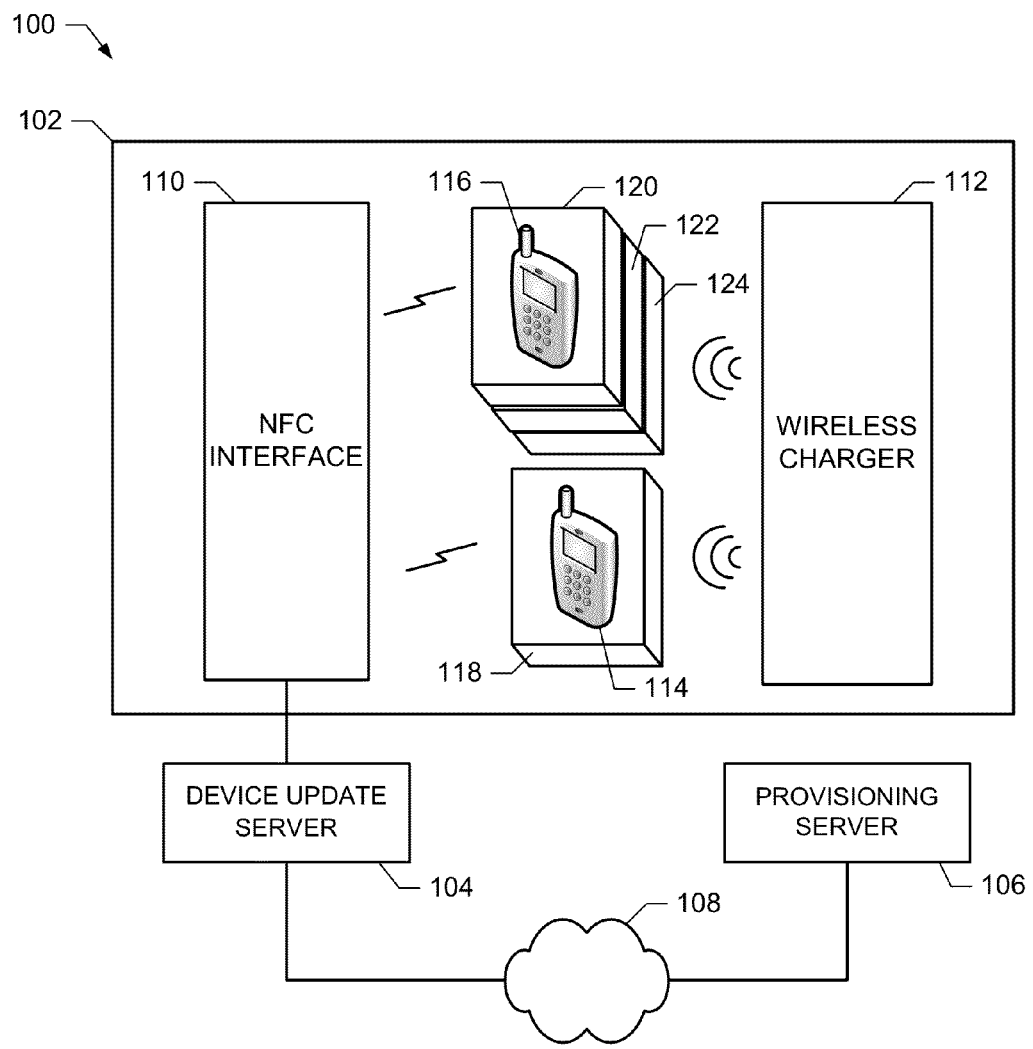
FIG. 1 is a block diagram of an example system to prepare a mobile device for provisioning to a user in accordance with the teachings of this disclosure.

FIG. 1 is a block diagram of an example system 100 to prepare a mobile device for provisioning to a user in accordance with the teachings of this disclosure. The example system 100 may be used to implement a retail point-of-sale for, among other things, mobile devices, and/or any other mobile device provisioning system (e.g., an information technology department).

The example system 100 illustrated in FIG. 1 may be used to prepare mobile devices to be provisioned to a user by, for example, updating the software of the devices to the latest and/or different versions and/or charging the wireless devices prior to provisioning, thereby ensuring the customers and/or users to whom the mobile devices are provisioned are provided with mobile devices that are fully functional (e.g., have the latest functionality available in software and a substantially full battery) upon provisioning. In some examples, the system 100 enables a provisioner (e.g., a point-of-sale employee, an information technology professional, etc.) of the mobile device to select for a user a mobile device that is up-to-date and charged and to avoid providing to the user a mobile device that either has an outdated software version or a battery that is not sufficiently charged (e.g., charged to at least a threshold).

The example system 100 includes a rack 102 or other type of storage shelf, a device update server 104, and a provisioning server 106. The example device update server 104 and the provisioning server 106 are communicatively coupled to a network 108. The network 108 of FIG. 1 may be a local area network (LAN) that is further communicatively coupled to a wide area network (WAN), such as the Internet.

The example rack 102 of FIG. 1 is equipped with a near-field communications (NFC) interface 110 and a wireless charger 112. Mobile devices (e.g., mobile devices 114, 116) that are not yet provisioned may be placed on the rack 102 (e.g., for storage, for display, etc.). In the example of FIG. 1, the mobile devices 114, 116 are contained in respective packaging 118, 120. The example packaging 120 may be stacked on additional packaging 122, 124 containing additional mobile devices. While on the example rack 102, the mobile devices 114, 116 are in communication with the NFC interface 110 and are electrically coupled and/or electromagnetically coupled to the example wireless charger 112.

The example NFC interface 110 is communicatively coupled to the device update server 104. The NFC interface 110 also communicates with the example mobile devices 114, 116. For example, when the mobile device 114 and the packaging 118 are first placed on the rack 102, the example mobile device 114 communicates with the device update server 104 via the NFC interface 110 to record its presence on the rack 102. For example, the mobile device 114 may send identifying information (e.g., serial number, model number, device name, etc.) to the device update server 104. The device update server 104 records information about the mobile device 114 (e.g., stores, in a database or other storage, an identifier of the mobile device 114 and a model number of the mobile device) and requests a software version of the mobile device 114 via the NFC interface 110. Additional information may be requested. The example mobile device 114 receives the request and responds with a software version (e.g., a software version number) and any other suitable information. In some examples, the mobile device 114 sends the software version with the initial registration communication. The example device update server 104 stores the software version with the mobile device identifier.

The device update server 104 of the illustrated example further compares the software version received from the mobile device 114 to a latest (e.g., most recent, updated, etc.) software version (e.g., compares version numbers) for the model number of the mobile device 114 to determine whether the software version of the mobile device 114 is the same (or corresponds to) the updated software version for the model number of the mobile device 114. The example device update server 104 maintains a database of model numbers of mobile devices and software versions associated with the model numbers. Additionally, the device update server 104 may include different software versions for mobile devices 114, 116 that are associated with different mobile service providers, different distribution locations, different countries, different geographical regions, and/or different communications technologies. For example, a first mobile device may receive a different software version than a second mobile device that is associated with a different mobile service provider.

Periodically, aperiodically, and/or on request, the device update server 104 obtains updated software version numbers and/or updated software (e.g., installation packages) for mobile devices corresponding to the model numbers in the database. For example, the device update server 104 may access servers for the respective manufacturers of the mobile devices via the network 108 to obtain the software and/or the version numbers. Thus, the device update server 104 compares the software version of the mobile device 114 to the latest software version for the model of the mobile device 114. In some examples, the device update server 104 compares the software version of the mobile device 114 to the latest software version for the model of the mobile device 114 each time the device update server 104 requests and/or receives software version updates. Additionally or alternatively, the device update server 104 may compare the software versions periodically (e.g., twice daily, daily, weekly, biweekly, etc.), aperiodically, and/or on request.

If the example mobile device 114 has the updated software version installed, the example device update server 104 allows the mobile device 114 to enter an idle state (e.g., power down, enter a sleep mode, enter a low-power mode, etc.). In the example idle state, the mobile device 114 may continue to charge its battery via the wireless charger 112. Additionally or alternatively, while the example mobile device 114 is in the idle mode, the device update server 104 may notify the mobile device 114 via the NFC interface 110 when updated software is available for the mobile device 114. In some examples, the notification causes the mobile device 114 to enter a wake state from the idle mode.

When the mobile device 114 receives a notification that an updated software version is available, the mobile device 114 initiates a wireless communication to download the updated software. For example, the mobile device 114 may download the software update via a wireless communication with a wireless local area network (WLAN) and the example network 108 using appropriate hardware and/or software present in the mobile device (e.g., WiFi, Bluetooth, etc.). In some other examples, the mobile device 114 may download the software update via a wireless communication with a wireless communication network (e.g., 3G, 4G, Long Term Evolution (LTE), etc.) using an appropriate cellular transceiver in the mobile device 114 and/or via the NFC interface 110 and the network 108 using NFC hardware and software in the mobile device 114. The mobile device 114 may request the software from a remote software update server (e.g., from the manufacturer) and/or from a local update server on the same LAN or WLAN as the mobile device 114. In some examples, the mobile device 114 waits to request, download, and/or install the software update until at least the battery in the mobile device 114 has at least a threshold amount of power to decrease the probability that the mobile device 114 will lose power during installation. In some other examples, the notification is a command from the device update server 104 that causes or conditionally causes the mobile device 114 to download the updated software version. The example mobile device 114 may delay requesting, downloading, and/or installing the software update until after business hours so that a user is not presented with a mobile device that is in the process of updating its software.

The example wireless charger 112 provides power to the example mobile devices 114, 116 without the mobile devices 114, 116 necessarily being physically connected to the charger 112 (e.g., without being plugged in). For example, the wireless charger 112 may be an inductive or electromagnetic charger that produces an electromagnetic field, which corresponding inductive or electromagnetic receivers in the mobile devices 114, 116 convert to energy to charge their respective batteries. In this manner, the example wireless charger 112 may charge the mobile devices 114, 116 above a threshold level of battery power without removing the mobile devices 114, 116 from their packages 118, 120. In some examples, the NFC interface 110 includes the wireless charger 112 or a second wireless charger. For example, the mobile devices 114, 116 may be configured to convert excess energy from transmissions by the NFC interface 110 (e.g., energy above the amount used to successfully conduct NFC communications) into energy for use in charging respective batteries.

At some time after the mobile device 114 is placed on the rack 102, the mobile device 114 is provisioned (e.g., programmed for use by a user). For example, the mobile device 114 may be selected for sale to a customer at a retail point-of-sale. In some examples, a provisioner (e.g., a retail employee, an information technology professional, etc.) queries the device update server 104 to determine a list of mobile devices 114, 116 that are prepared for provisioning to the customer (e.g., mobile devices that have the latest software version, that are charged to a battery level higher than a threshold level, etc.). In other examples, the retail employee simply requests a mobile device of a particular model from the device update server 104, and the device update server 104 selects one of the mobile devices 114, 116 based on the requested model (e.g., the mobile device 114) that has been prepared for provisioning to the customer (e.g., has the latest software version, charged to a level higher than a threshold charge).

The example device update server 104, the mobile device 114, and/or a user interface may inform the provisioner which mobile device is selected by causing the selected mobile device 114 to make noise, light up, or otherwise distinguish itself from the other mobile devices on the rack 102 and/or by providing the provisioner with identifying information about the selected mobile device 114 (e.g., serial number, approximate location on the rack 102, etc.). In some other examples, the NFC interface 110 may have a reference location that is stored with a record of the selected device in the device update server 104 and/or the provisioning server 106. When the mobile device 114 is selected, the provisioner is provided with the NFC tag information and/or the reference location in addition to other identifying information for the mobile device 114.

Continuing with the example, the provisioner (e.g., the retail employee) provisions the selected mobile device 114 for the user. In some examples, the provisioning includes assigning to the mobile device a user identifier and/or a telephone number, enabling services for use on the mobile device, and/or performing any other tasks to provision the mobile device 114. In some examples, the provisioner causes the mobile device 114 to connect to the provisioning server 106 (e.g., by running a setup route on the mobile device 114), which performs one or more provisioning tasks. After performing the provisioning, the example provisioning server 106 removes the mobile device 114 (e.g., removes or deletes a record of the mobile device 114) from the device update server 104 and/or changes the record so that the example device update server 104 no longer attempts to notify the mobile device 114 when software updates are available. Removing the mobile device 114 may include, for example, removing the identifying information for the mobile device 114 from the database or storage of the device update server 104 and/or changing a status variable corresponding to the mobile device 114 in the device update server 104 (e.g., archiving the mobile device 114 information). The user of the example mobile device 114 is provided with a mobile device having the latest software and an adequate battery charge (e.g., more than a threshold amount of power in the battery of the mobile device 114).

The example device update server 104 and the example provisioning server 106 may be, but are not necessarily, located at substantially the same location as the rack 102. For example, areas within a retail point-of-sale (e.g., a brick-and-mortar store) or physically within an information technology office of a company may be considered the same location. Thus, a rack 102 in a sales or display area of a retail store may be considered in the same location as the device update server. However, the device update server 104 and/or the provisioning server 106 may be located at different location(s) from the rack 102. For example, the device update server 104 and/or the provisioning server 106 may be located at a central office of a wireless communications provider, at a mobile device manufacturer location, at a central information technology center, etc., while the rack 102 is located at a retail point-of-sale (e.g., a brick-and-mortar store) or a satellite (e.g., remote) information technology office.

Figure 2:
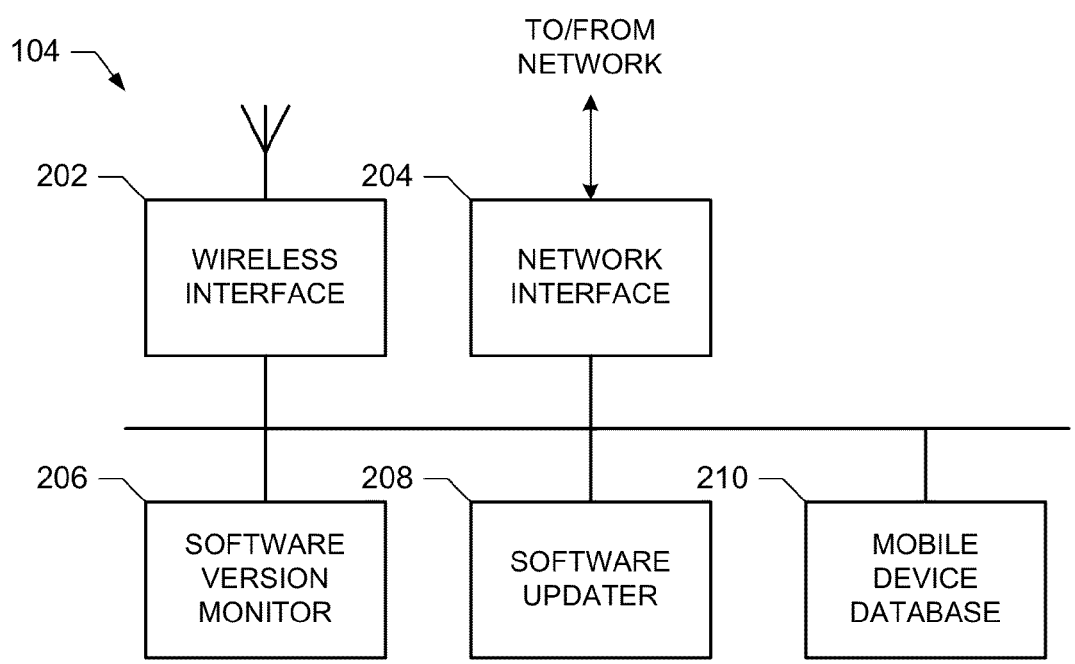
FIG. 2 is a block diagram of an example device update server for use in the system of FIG. 1.

FIG. 2 is a more detailed block diagram of the example device update server 104 for use in the system 100 of FIG. 1. The example device update server 104 of FIG. 2 includes a wireless interface 202, a network interface 204, a software version monitor 206, a software updater 208, and a mobile device database 210. The device update server 104 may be used to prepare a mobile device (e.g., the mobile devices 114, 116 of FIG. 1) for provisioning to a user by determining a software version of the mobile device and/or updating the software of the mobile device prior to provisioning the mobile device to a user.

The example wireless interface 202 enables communication with the mobile devices 114, 116 of FIG. 1. In some examples, the wireless interface 202 is implemented using one or more of an NFC interface (e.g., the NFC interface 110 of FIG. 1), a Bluetooth interface, an infrared communications interface, a wireless fidelity (WiFi) direct connection (e.g., ad hoc network) and/or any other past, present, and/or future wireless interface and/or protocol. In some examples, the wireless interface 202 may be replaced with a wired interface that enables communication with the mobile devices 114, 116 via their respective packaging 118, 120 using any appropriate wired protocol. In examples in which a wired interface is used, the mobile devices 114, 116 may be physically connected or plugged into the example wired interface to be updated and/or charged prior to provisioning to the user.

The example network interface 204 enables communication between the example software version monitor 206, the example software updater 208, and/or the example mobile device database 210 and a network (e.g., a LAN, a WLAN, and/or a WAN such as the network 108 of FIG. 1).

The example software version monitor 206 of FIG. 2 records information about the mobile devices (e.g., the mobile devices 114, 116) (e.g., when they are placed on the rack 102) and removes the records for the mobile devices (e.g., when they are provisioned to a user). In some examples, the software version monitor 206 communicates with the mobile device 114, 116 via the wireless interface 202 to obtain identifying information and respective software versions when the respective presences of the mobile devices 114, 116 are detected (e.g., when the mobile devices 114, 116 are placed on the rack 102). The software version monitor 206 stores the identifying information and the software versions in the example mobile device database 210.

The example software version monitor 206 determines a software version of one or more non-provisioned mobile devices (e.g., the mobile devices 114, 116). To determine the software versions, the software version monitor 206 communicates with the example mobile devices 114, 116 via the wireless interface 202 (e.g., the NFC interface 110 of FIG. 1, a Bluetooth interface, etc.) and/or via the network interface 204 (e.g., a connection to a WLAN to which the mobile devices 114, 116 are connected). In some examples, the software version monitor 206 provides the mobile devices 114, 116 with access or authentication information for a WLAN upon registration of the mobile devices 114, 116. In particular, the example software version monitor 206 requests the mobile devices 114, 116 to provide information about their respective current software versions (e.g., version numbers). The software version monitor 206 receives the respective software versions and compares them to the latest software versions for the respective mobile device models. If, for example, the mobile device 114 does not have the most recent software version, the software version monitor 206 notifies the mobile device 114 via the wireless interface 202 that the software update is available.

In some examples, the software version monitor 206 requests updated information about the software versions for models of the mobile devices 114, 116 on the rack 102 of FIG. 1. For example, the software version monitor 206 may access an external server via the network interface 204 to receive the software versions. The software version monitor 206 stores the software versions in a storage device such as the mobile device database 210.

The example software updater 208 of FIG. 2 sends software updates to the non-provisioned mobile device 114, 116. For example, the software updater 208 may provide the updated software via the wireless interface 202 (e.g., via NFC communications, Bluetooth, etc.) and/or via the network interface 204 (e.g., via WiFi, 3G, 4G, LTE, etc.). The example software updater 208 obtains updated software versions (e.g., installation packs) when the updated software is published or otherwise made available by the manufacturer(s) of the mobile devices 114, 116. In some examples, the software updater 208 obtains the updated software from an external server via the network interface 204 and/or the network 108.

The example mobile device database 210 stores information associated with the mobile devices 114, 116 and removes the information the mobile devices 114, 116 when the mobile devices 114, 116 are provisioned. In the example of FIG. 2, the mobile device database 210 stores identifying information for the recorded mobile devices 114, 116 and the software version for the mobile devices 114, 116. The example mobile device database 210 receives the identifying information and/or the software version from the example software version monitor 206.

While the example device update server 104 of FIG. 2 includes both the software version monitor 206 and the software updater 208, in some examples, a first server includes the software version monitor 206 to determine a software version of the mobile device and/or notify the mobile device of an available software update, and a second server includes the software updater 208 to update the software of the mobile device.

Figure 3:
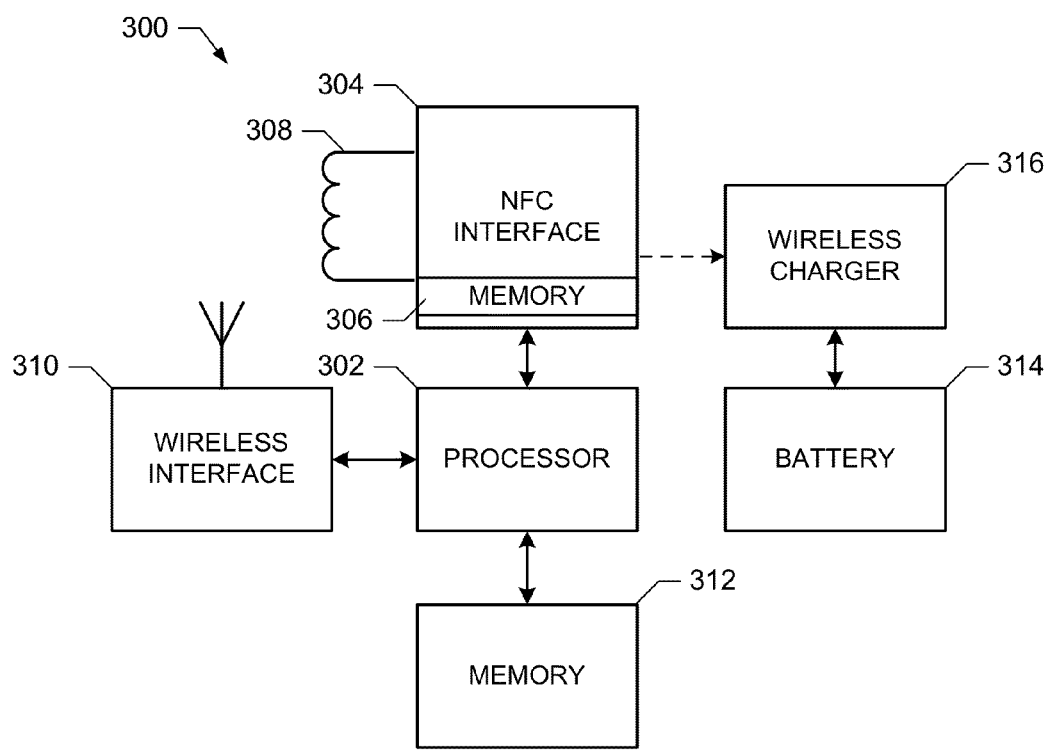
FIG. 3 is a diagram of an example mobile device for use in the system of FIG. 1.

FIG. 3 is a diagram of an example mobile device 300 for use in the system of FIG. 1. The example mobile device 300 may be used to implement the mobile devices 114, 116 of FIG. 1. As illustrated in FIG. 3, the mobile device 300 includes a processor 302 that is connected to a close-proximity communication device, such as an NFC interface 304.

The processor 302 may be implemented using any suitable microcontroller or microprocessor capable of executing instructions. Additionally, the processor 302 may include hardware implementations, such as application-specific integrated circuits (ASIC), programmable logic devices (PLDs), or any other suitable logic device or devices.

The NFC interface 304 includes a memory 306 and an antenna 308. In one example, the NFC interface 304 is implemented according to the International Standards Organization standard ISO 14443. The example NFC interface 304 of FIG. 3 includes any combination of software, firmware, and/or circuitry to implement the ISO 14443 standard or any other NFC interface standard. Implementation may also be done according to other standards. In some examples, the memory 306 stores information related to the mobile device 300, such as a software version, credentials, authorizations, historical information, etc., that may be transferred to a host device (e.g., the NFC interface 110 of FIG. 1) with a request for information when the NFC interface 304 is interrogated. In addition, the NFC interface 304 may receive requested information from a host device (e.g., the NFC interface 110). In the illustrated example, the received information is stored in the memory 306 of the NFC interface 304 for use by the processor 302. Example received information includes static and/or dynamic data, requests for information (e.g., a software version of the mobile device 300), and/or instructions to be performed by the processor 302. While the example mobile device 300 of FIG. 3 includes an NFC interface 304, the NFC interface 304 may be replaced or supplemented by other types of communications interfaces, such as Bluetooth.

The example wireless interface 310 of FIG. 3 may be implemented using any wired or wireless communication interface. For example, the wireless interface 310 may be implemented using an Ethernet connection, or any other wired connection. Alternatively, the wireless interface 310 may be implemented using a WiFi interface, a cellular modem, which may be a second generation (2G) and/or third generation (3G) and/or fourth generation (4G) cellular modem, an LTE modem, or the like, and/or any other wireless network interface. In some examples, the processor 302 retrieves information from a server (e.g., retrieves a software update from the example device update server 104 of FIG. 1) via the wireless interface 310. Although shown as having a single wireless interface 310 the mobile device 300 may include several different wireless interfaces using one or more different wireless access technologies.

The example mobile device 300 also includes a memory 312. The example memory 312 may include volatile (e.g., random access memory (RAM)) and/or non-volatile memory (e.g., read only memory (ROM), solid state memory, etc.). The example memory 312 stores, among other things, software for the example mobile device 300. The software includes firmware, an operating system, and/or applications to be executed by the processor 302. As mentioned above, the software may be updated to newer versions. Newer versions of mobile device software often include additional features, fix software bugs, and/or improve performance of the mobile device 300.

The example mobile device 300 of FIG. 3 further includes a battery 314 and a wireless charger 316. The battery 314 provides electrical power to the components of the mobile device 300, including the processor 302, the NFC interface 304, the wireless interface 310, and/or the memory 312. The wireless charger 316 receives power (e.g., electromagnetic field energy, etc.) and converts the power to electrical energy to charge the battery 314. In some examples, the wireless charger 316 derives energy from the NFC interface 304. For example, the NFC interface 304 provides energy received via the antenna 308 to the wireless charger 316, which converts the energy to charge the battery 314.

In some examples, the mobile device 300 is prepared for provisioning by a device update server. When the mobile device 300 is placed on a rack (e.g., the rack 102) that is communicatively coupled to a device update server (e.g., the device update server 104 of FIG. 1), the NFC interface 304 receives a request for information about the mobile device 300. The processor 302 receives the request from the NFC interface 304 (e.g., from the memory 306), processes the request, and transmits the requested information (e.g., information representative of a software version) via the NFC interface 304. To process the request, the example processor 302 may access the memory 312 to obtain a software version of the software stored in the memory 312.

At a later time, but prior to provisioning of the example mobile device 300, the processor 302 receives a notification (e.g., via the NFC interface 304 and/or the wireless interface 310) that an updated software version is available. In response, the processor 302 accesses the updated software by requesting the software from a software update server via the wireless interface 310 and a network (e.g., the network 108 of FIG. 1). In some examples, the processor 302 determines whether the battery 314 has at least a threshold amount of power prior to downloading or installing the updated software.

The mobile device 300 receives (e.g., downloads) the updated software and stores the updated software on the memory 312. After downloading the updated software, the example processor 302 installs the software (prior to provisioning the mobile device 300 to a user). After installing the software, or if there is otherwise no software to be installed at a particular time, the processor 302 may enter a sleep or low power mode. The processor 302 may be woken by, for example, an NFC notification.

Block diagrams of apparatus and flowcharts representative of example processes that may be executed to implement some or all of the elements and devices described herein are described below and shown in the drawings. In these examples, the process represented by each flowchart may be implemented by one or more programs comprising machine readable instructions for execution by a processor or controller or any suitable hardware, such as shown in FIGS. 1, 2, and/or 3, and/or any other suitable device.

The one or more programs may be embodied in software or software instructions stored on a tangible medium such as, for example, a flash memory, a CD-ROM, a hard drive, a DVD, or a memory associated with a processor, but the entire program or programs and/or portions thereof could alternatively be executed by a device other than the microprocessor and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example wireless interface 202, the example network interface 204, the example software version monitor 206, the example software updater 208, the example mobile device database 210, the example processor 302, the example NFC interface 304, the example memory 306, 312, the example wireless interface 310 and/or, more generally, the example device update server 104, the example mobile devices 114, 116, 300 could be implemented by any combination of software, hardware, and/or firmware. Also, some or all of the processes represented by the flowcharts may be implemented manually. As used herein, the term tangible computer readable medium is expressly defined to include any type of computer readable storage.

Additionally or alternatively, the example processes described herein may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium.

Figure 4:
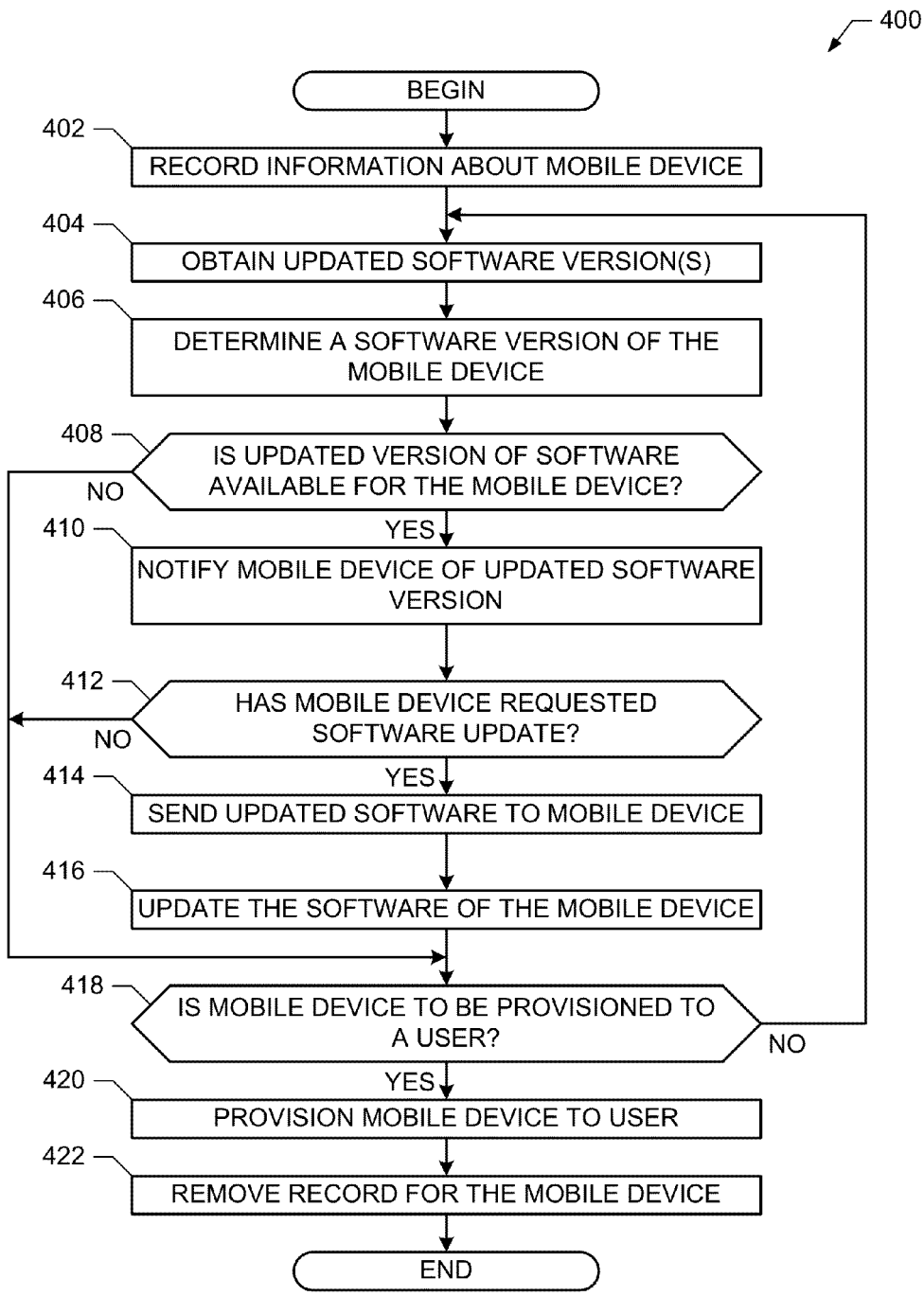
FIG. 4 is a flowchart representative of an example method to prepare a mobile device for provisioning to a user.

A process 400, as shown in FIG. 4, may be carried out by system, such as the system 100 of FIG. 1. The example process 400 begins by recording (e.g., via the software version monitor 206 and/or the mobile device database 210) information about a mobile device (e.g., the mobile devices 114, 300 of FIGS. 1 and 3) (block 402). Recording the information may occur in response to, for example, the software version monitor 206 detecting the presence of the mobile device 114 on the rack via the wireless interface 202 and/or the NFC interface 110). The process 400 (e.g., via the example software version monitor 206) obtains updated software (e.g., version number(s) and/or installation packages) for one or more mobile device models (e.g., mobile device model(s) that may be recognized by the rack 102) (block 404).

The example process 400 (e.g., via the software version monitor 206) determines a software version of the mobile device 114 (block 406). For example, the software version monitor 206 of FIG. 2 requests a software version and a model number from the mobile device 114 via the wireless interface 202 and/or the NFC interface 110. The process 400 determines whether an updated version of software is available for the mobile device 114 (block 408). For example, the software version monitor 206 may determine whether the most recent software version available for the mobile device 114 has a version number greater than the version number returned by the mobile device 114. If there is an updated software version available for the mobile device (block 408), the example process 400 notifies (e.g., via the software version monitor 206) the mobile device 114 of the updated software version (block 410).

The example process 400 determines whether the mobile device 412 has requested a software update (block 412). For example, in response to receiving the notification (and subject to other conditions such as sufficient charge being present in the battery of the mobile device 114), the mobile device 114 sends a request to the software updater 208 of FIG. 2 via an NFC communication, a WiFi communication, or a cellular communication (e.g., 2G, 3G, 4G, LTE, etc.). The example software updater 208 receives the software update request via the wireless interface 202 and/or via the network interface 204.

If the mobile device 114 has requested the software update (block 412), the example process 400 of FIG. 4 sends (e.g., via the software updater 208) the updated software to the mobile device (block 414). For example, the software updater 208 may send updated software (e.g., an installation package, an application, etc.) to the requesting mobile device 114 via the same interface from which the request was received. The example process 400 updates the software of the mobile device 114 (block 416).

After updating the software (block 416), if an updated version of software is not available for the mobile device 114 (block 412), or if the mobile device 114 has not requested an available software update (block 408), the example process 400 of FIG. 4 determines whether the mobile device 114 is to be provisioned to a user (block 418). For example, the mobile device 114 may be selected for provisioning to a customer purchasing the mobile device 114 or otherwise receiving the mobile device 114 for use. In some examples, the process 400 may avoid selecting the mobile device 114 if, for example, there is an updated version of software available (block 408) but the mobile device 114 has not requested the software update (block 412). In some such examples, block 412 may iterate until the mobile device 114 requests and/or installs the software update. In some other examples, control may return to block 404 to continue obtaining updated software version (s) for the example mobile device 114 so that, when the mobile device 114 requests the software update (block 412), the mobile device 114 receives the latest software version. If the mobile device 114 is not to be provisioned (block 418), control returns to block 404 to continue obtaining updated software version(s) and/or updating software for the mobile device as appropriate.

If the mobile device 114 is to be provisioned (block 418), the example process 400 provisions the mobile device 114 to a user (block 420). For example, the provisioning server 106 of FIG. 1 may enable services on the mobile device 114 and/or assign a phone number to the mobile device 114. The example process 400 removes the record for the mobile device 114 (block 422). For example, the software version updater 206 and/or the mobile device database 210 of FIG. 2 may remove the record for the device 114 from the database 210 so that the software version updater 206 may avoid attempting to notify the mobile device 114 of updated software when the mobile device 114 is no longer on the rack 102 (e.g., being prepared to be provisioned). The example process 400 may then end (at least, with respect to the mobile device 114). However, the example process 400 may be performed for multiple devices simultaneously and, therefore, may continue for additional mobile devices remaining on the rack 102.

Figure 5:
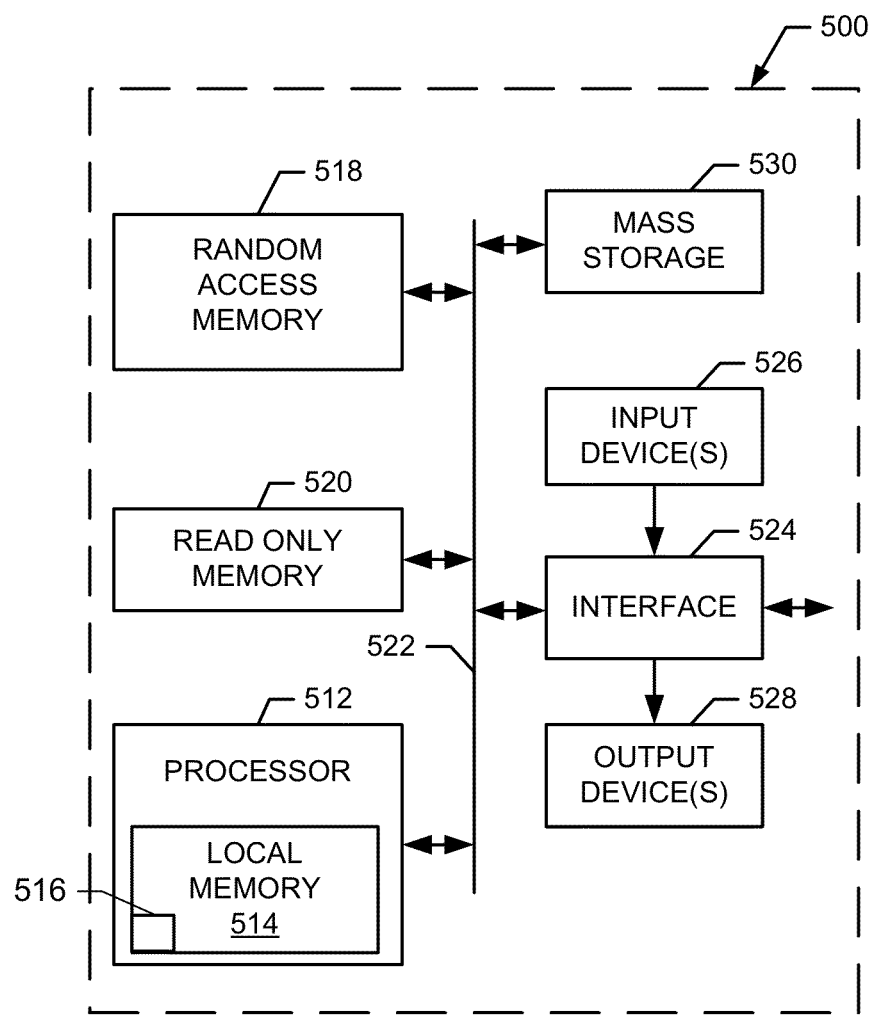
FIG. 5 is a block diagram of an example processing system to implement the systems, methods, and apparatus disclosed herein.

FIG. 5 is a block diagram of an example processing system 500 capable of implementing the apparatus and methods disclosed herein. The processing system 500 can correspond to, for example, a mobile device, an access control system, or any other type of computing device.

The system 500 of the instant example includes a processor 512 such as a general purpose programmable processor, an embedded processor, a microcontroller, etc. The processor 512 includes a local memory 514, and executes coded instructions 516 present in the local memory 514 and/or in another memory device. The processor 512 may execute, among other things, machine readable instructions to implement any, some or all of the processes represented in FIG. 4. The processor 512 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 512 is in communication with a main memory including a volatile memory 518 and a non-volatile memory 520 via a bus 522. The volatile memory 518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 520 may be implemented by flash memory and/or any other desired type of memory device. Access to the main memory 518, 520 is typically controlled by a memory controller (not shown).

The system 500 also includes an interface circuit 524. The interface circuit 524 may be implemented by any type of interface standard, such as an Ethernet interface, a universal serial bus (USB), and/or a third generation input/output (3GIO) interface.

One or more input devices 526 are connected to the interface circuit 524. The input device(s) 526 permit a user to enter data and commands into the processor 512. The input device(s) can be implemented by, for example, a keyboard, a mouse, a touchscreen, a track-pad, a trackball, an isopoint and/or a voice recognition system.

One or more output devices 528 are also connected to the interface circuit 524. The output devices 528 can be implemented, for example, by display devices (e.g., a liquid crystal display, a cathode ray tube display (CRT)), by a printer and/or by speakers. The interface circuit 524, thus, typically includes a graphics driver card.

The interface circuit 524 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The system 500 also includes one or more mass storage devices 530 for storing software and data. Examples of such mass storage devices 530 include floppy disk drives, hard drive disks, compact disk drives and digital versatile disk (DVD) drives.

As an alternative to implementing the methods and/or apparatus described herein in a system such as shown in FIG. 5, the methods and or apparatus described herein may be embedded in a structure such as a processor and/or an ASIC (application specific integrated circuit).

Although the example processes are described with reference to flowcharts, many other techniques for implementing the example systems, methods, and/or apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. While the example block diagrams are described as implementing the processes of the flowcharts, the apparatus of the block diagrams may implement any process and, likewise, the processes of the flowcharts may be implemented by any apparatus, device, system, software, or combination thereof.

Finally, although certain example systems, methods, and apparatus have been described herein, the scope of coverage of this disclosure is not limited thereto. On the contrary, this disclosure covers all systems, methods, and apparatus and equivalents described and claimed herein.

What is claimed is:

1. A method comprising:
    recording information about a mobile device via wireless communications in response to detecting a presence of the mobile device in a first location;
    wirelessly charging the mobile device via a close-proximity communications interface prior to provisioning the mobile device;
    sending a first close-proximity communications signal to cause the mobile device to enter a wake state;
    determining a software version of the mobile device via wireless communications in response to sending the first close-proximity communications signal;
    updating the software of the mobile device via wireless communications prior to provisioning the mobile device to a user;
    selecting the mobile device based on determining that the mobile device has at least a threshold battery charge and has software having at least a threshold software version; and
    causing the mobile device to distinguish itself from other mobile devices via a perceptible action in response to the selection.

2. A method as defined in claim 1, wherein the wireless communications comprises at least one of wireless fidelity (WiFi), near-field communications, or mobile telecommunications.

3. A method as defined in claim 1, further comprising providing a software update to the mobile device via a first wireless communications protocol different from the close-proximity communications.

4. A method as defined in claim 1, wherein updating the software is performed while the mobile device is in a packaging.

5. A method as defined in claim 1, wherein detecting that the mobile device is present in the first location comprises detecting that the mobile device has entered the first location.

6. A method as defined in claim 1, further comprising removing a record of the mobile device in response to provisioning the mobile device.

7. A method as defined in claim 1, wherein provisioning the mobile device to the user comprises at least one of assigning a phone number to the mobile device, assigning an account number to the mobile device, or enabling wireless communication services on the mobile device.

8. A method as defined in claim 1, further comprising not provisioning the mobile device in response to determining that the mobile device has a software version older than an updated software version.

9. A method as defined in claim 1, wherein updating the software of the mobile device is in response to a request from the mobile device.

10. A mobile device, comprising:
a battery;
a close-proximity communications interface comprising a wireless charger to charge the battery prior to receiving provisioning information;
an output device;
a processor; and
a memory coupled with the processor, the memory storing machine readable instructions which, when executed by the processor, cause the processor to, prior to receiving the provisioning information:
enter a wake state in response to a first close-proximity communications signal received via the close-proximity communications interface;
transmit information representative of a software version to a server in response to entering the wake state;
install a software update received via wireless communications; and
cause the output device to generate a perceptible output to distinguish the mobile device from other mobile devices in response to receiving an indication of a selection of the mobile device for provisioning.

11. A mobile device as defined in claim 10, further comprising a wireless interface to receive the software update.

12. A mobile device as defined in claim 10, wherein the instructions, when executed, cause the processor to transmit at least one of the information representative of the software version or identifying information for the mobile device in response to detecting that the mobile device is in a first location.

13. A mobile device as defined in claim 10, wherein installing the software update is in response to receiving a notification associated with a software update.

14. A system, comprising:
a communications interface to:
provide a signal to a non-provisioned mobile device via a close-proximity communications interface, the signal to cause the non-provisioned mobile device to enter a wake state; and
provide a signal to the non-provisioned mobile device in response to the non-provisioned mobile device being selected for provisioning, the signal to cause the non-provisioned mobile device to distinguish itself from other mobile devices via a perceptible action in response to the selection;
a software version monitor to record information about the non-provisioned mobile device via wireless communications in response to detecting that the mobile device is present in a first location and to receive respective information representative of a software version for the non-provisioned mobile device, the wireless communications being different than the close-proximity communications interface; and
a software updater to send a software update to the non-provisioned mobile device via wireless communications.

15. A system as defined in claim 14, further comprising a mobile device database to store records including the information about the non-provisioned mobile device and to remove a record of the non-provisioned mobile device in response to the mobile device being provisioned.

16. A system as defined in claim 14, wherein the communications interface is to request a software version from the non-provisioned mobile device and to receive information representative of the software version from the non-provisioned mobile device.

17. A system as defined in claim 16, wherein the software updater is to notify the non-provisioned mobile device via the communications interface when a software update is available.

18. A method as defined in claim 1, wherein the perceptible action comprises at least one of making a noise or lighting up the mobile device.

19. A mobile device as defined in claim 10, wherein the output device comprises at least one of a display device or a speaker, the perceptible output comprising at least one of making a noise via the speaker or lighting up the display.

20. A mobile device as defined in claim 10, wherein the instructions are further to cause the processor to delay installing the software update until a time period during which the mobile device will not be provisioned.

* * * * *